Patented Feb. 23, 1937

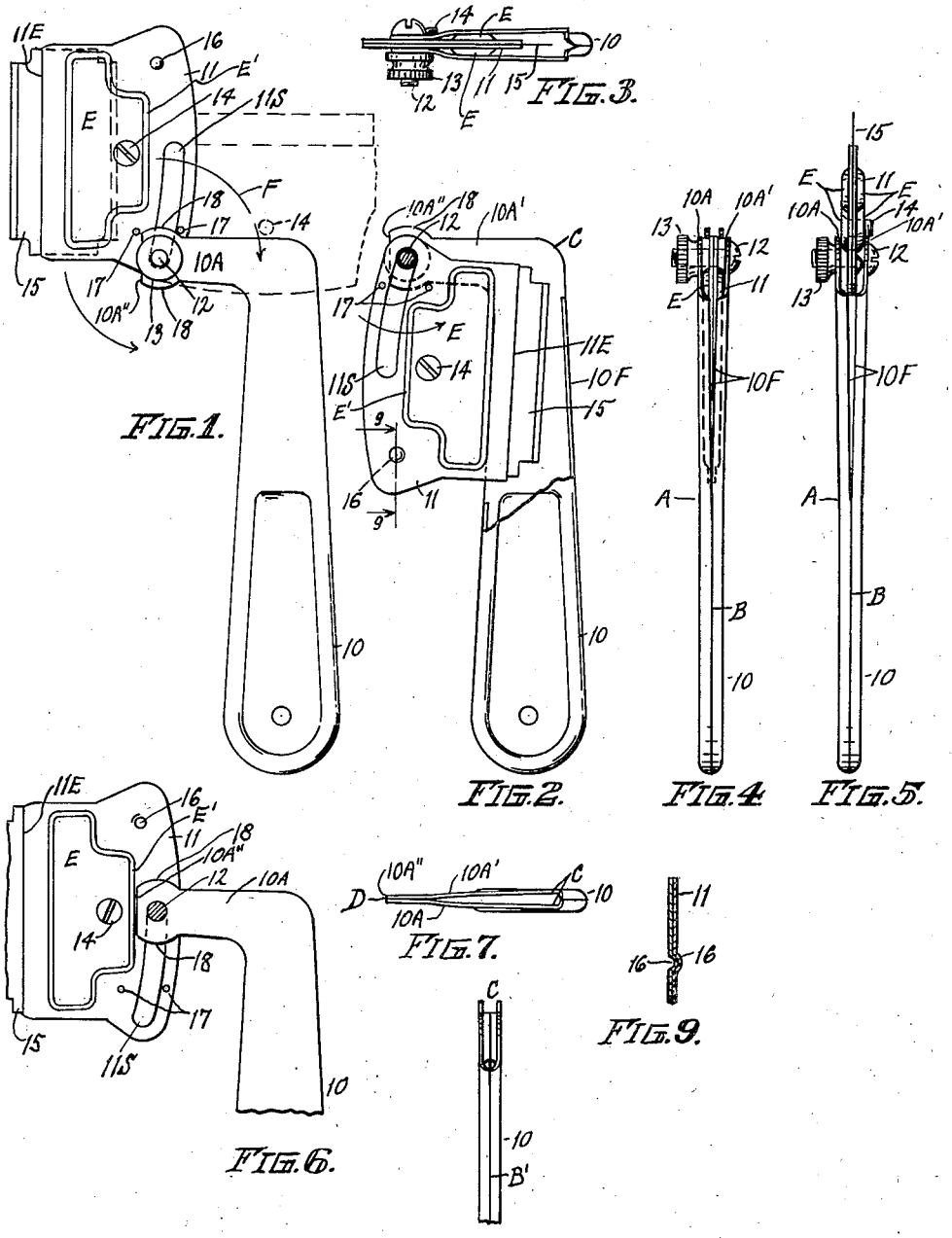

2,071,562

UNITED STATES PATENT OFFICE 2,071,562

SCRAPER

Jennings Nelson, St. Paul, Minn.

Application February 11, 1936, Serial No. 63,346

5 Claims. (Cl. 145—47)

My invention relates to devices known generally as scrapers and adapted for many uses such for example as where a straight, sharp edge is required for removing paint or frost from areas of glass, or for cutting purposes such as in bundle wrapping, or for opening cartons etc., etc.

The main object is to provide a highly efficient and inexpensive, yet simple, scraping and cutting device involving certain features of construction as hereinafter fully set forth, reference being had to the accompanying drawing, in which,—

Fig. 1 is a side elevation of my improved scraper and cutter device with its cutter head positioned to hold the cutting edge in a position parallel to the handle and pivotally retained in said position. Fig. 2 is a side elevation corresponding to Fig. 1 with the upper portion of the near side of the handle removed and the cutter head shown in closed or sheathed position. Fig. 3 is a top view of Fig. 2. Fig. 4 is a right side or edge view of Fig. 2 and Fig. 5 is a modification of Fig. 4 to show the cutter head in position with its blade edge in a plane at right angles to the handle and forwardly thereof. Fig. 6 is a modification of the upper half of Fig. 1 showing the cutter head positioned central of the handle arm. Fig. 7 is a top view of the handle only. Fig. 8 is a rear edge view of approximately the upper half of the handle. Fig. 9 is an enlarged sectional detail view as on line 9—9 in Fig. 2.

Referring to the drawing by reference numerals, 10 is a handle preferably made of two counterpart stamped sheet metal pieces of inverted L-shape, the longer part preferably tapered upwardly to the arm forming the L-shape and said arm being further tapered to its end. Approximately the lower half of the two parts of the handle are spot welded, riveted or otherwise permanently connected as from the bottom end to level A in Figs. 4 and 5.

B designates the contact line of the connected lower handle parts. 10A—10A' are the two arms integral of the handle, being normally spaced apart at the convergence of the handle and arm parts, as at C in Figs. 2, 7, and 8, but their free, registering ends being in pressed contact as at D in Fig. 7 but adapted to be spread apart to frictionally and pivotally engage a blade holder or scraper head 11, there being provided in said end parts of the arm a bore for an adjustment and pivot screw 12 having a thumb nut 13.

The scraper head 11 comprises also two counterpart sheet metal plates of approximately rectangular form and clamped together by means of a single flat-head screw 14 the head of which is countersunk in one plate and the shank of said screw projects through and beyond a correspondingly threaded hole in the other plate. The outer edge of the scraper head has two corresponding straight edges 11E beyond which protrudes a cutting blade, preferably a safety-razor blade 15 with the exposed cutting edge outward of and parallel to edge 11E of the holder or head the cutting blade being rigidly clamped between the two plates of the scraper head by the screw 14. Obviously the blade 15 is readily removed or replaced.

The inner edge of the scraper head may be arcuate as shown and concentric thereof and inwardly of this edge is provided a slot 11S extending from the center toward one end of the head only, the screw 12 traversing this slot when the head is positioned between the termini of the handle arm.

When the scraper head is pivotally retained the screw 12 is in the outer end part of the slot 11S and the head may be swung around as from the position shown in full lines in Fig. 1, to the dotted line position in the same figure, or to the closed position shown in Fig. 2; in the latter position the cutting edge of the blade and adjacent parts of the blade holder or head being positioned within the upper part of the handle.

Among the features of my scraper device is the construction of the handle above the level A in which both the handle members are normally closed and sprung together as on line B' (Fig. 8) but are spread above level A by the rotary movement of the head, said head being provided with certain embossments E at one or both sides which cause the handle members to be spread but continuously bearing frictionally against both sides of the head. The embossed areas of both plates comprising the scraper-head are designated E and are of irregular elongated form mainly parallel to the free or outer edge of the head and the edges of said embossments being rounded so that when the head is swung to the position shown dotted in Figs. 1 and 5, or to the closed position as shown in Fig. 2, the embossed parts will frictionally engage and spread the upper handle members and thus the head is frictionally retained in said positions in addition to which the thumb screw may be manipulated for further friction or clamping action on the scraper head. Above level A the back edge of the handle is formed with inwardly directed registering flanges 10F (see Figs. 2 and 5) terminating at a common level below the top edge of arm 10A providing a seat for the cutter head when the latter is in the position shown dotted in Fig. 1.

In Figs. 1 and 5 it will be readily seen that when the head 11 is swung as from the full line position to the position indicated by dotted lines, as in direction of arrow F, the screw 14 is so located that the scraper head comes to a stop when the protruding threaded end of the screw contacts the top edge of arm 10A' of the handle (as in Fig. 5) at which time the cutting edge of the razor blade is at right angles to the handle and forward thereof. The head and its blade 15 are also frictionally held thus by the embossments E spreading the handle sections 10A and 10A' which thus clamp the head between them.

In Figs. 6 and 7 is clearly shown that the extreme ends of the arms 10A—10A' comprise each a straight edge 10A" both registering, to simultaneously bear or engage the inner straight edges E' of the embossments E of the head when the latter is moved to a position in line with the arms 10A—10A' at which time the screw 12 is engaged in the inner terminus of the slot 11S.

Then clamping the arms 10A—10A' toward each other by manipulating the thumb-screw 13 the entire head 11 is rigidly retained in non-rotatable condition with the cutter blade exposed with its cutting edge parallel to the center line of the main handle. This position of the cutting blade is desirable for various purposes, such for example as for any knife action, cutting bundle cords, opening paper cartons or scraping areas of glass or other materials.

In Figs. 1, 2, 6, and 9, 16 are a pair of registering upsets or teats pressed in the metal of the two members comprising the head 11 to key them together in properly registering positions.

In replacing the cutter blade 15, which may be an ordinary one or two edged safety razor blade, the screw 14 is merely loosened until the blade 15 is readily removable to be replaced or simply to turn the blade to expose the other cutting edge if the blade is of the two-edged type.

17 are a pair of outwardly projecting teats similar to upsets 16 (Fig. 9) punched in the metal of both head members and so located as to contact and guide the head member while in circular movement when the head is pivotally engaged in the outer end of the slot 11S, said teats engaging the outer circular edges 18 of the end parts of the arms 10A—10A' of the handle member. Obviously these projections 17 do not function when the head is retained central of the handle arms as in Fig. 6.

In the use of my device it will now be readily understood that the cutter head may be rotated pivotally while retained with screw 12 in the outer end part of the slot 11S, to present the cutting blade selectively in a plane longitudinal of the handle, transversely of the handle and forward of it, or in any desired angular position between said two positions or to its closed position sheathed within the handle.

Or, the cutter blade and head may be easily adjusted and the cutter head secured non-rotatably with the cutting edge of the blade presented outwardly in a plane parallel to the handle, as in Fig. 6.

I have illustrated and herein described the preferred embodiment of my scraper device, but it is obvious that modifications may be made within the scope of the following claims and the construction disclosed without departing from the scope and spirit of the invention.

I claim:

1. A combination cutter and scraper device of the class described comprising an elongated handhold, bifurcated above a predetermined level, said bifurcation comprising also an arm extending to one side from the hand-hold, said bifurcated parts normally sprung toward each other, the termini of said arm comprising registering rounded heads apertured centrally and the outer parts formed with registering straight faces, a cutter head insertable between said termini of the arm, a pivot screw in the apertures of the latter and passing through the cutter head, said cutter head formed with an elongated slot adjacent its rear edge and through which the said pivot screw is passed, said slot extending from one end part of the head to its central, inner part, said pivot screw adapted to be adjusted for pivotal and frictional engagement of the cutter head in said slot in either end of it, to retain the head in either of two positions, one position pivotal and the other position non-pivotal.

2. The structure specified in claim 1, in which said cutter head is slidable on said pivot screw by means of said slot, from the outer to the inner end of the latter, or vice versa, an embossment formed on each of the two outer faces of the cutter head each embossment with an edge part parallel to the said slot said edge parts engageable simultaneously by the straight faces at the extreme ends of the handle-arm parts to hold the cutter head rigidly at the end of the handle arm with the cutting edge of the blade exposed to one side of the handle and in a plane laterally thereof.

3. A scraper device of the class described comprising an inverted L-shaped handle, a cutter head pivotally retained in the upper terminus of the handle, said handle comprising two counterpart metal plates secured together permanently below a predetermined level and above said level formed with spaced parallel walls normally sprung toward each other up to the said upper terminus but adapted to be sprung apart at said terminus to frictionally clamp and pivotally retain the cutter head therebetween, the longer part of said L-shaped handle comprising a hand-hold tapered upwardly toward the arm forming the L-shape of the handle, said hand-hold wall parts above the level described comprising in part a pair of registering flanges, one in each section of the handle and contacting each other when the cutter head is in certain position, said contact flanges extending upwardly at the edge opposite from the arm, to a predetermined height to provide a seat for the cutter head when the latter is in transverse position of the handle, the side of said hand-hold and the arm opposite said flanged side formed with the walls spaced apart to provide a pocket for inclosing portions of the cutter head when in position with its cutting blade sheathed between said walls.

4. A scraper device comprising an inverted L-shaped handle of which the longer arm comprises a hand-hold and the short arm extends integrally at right angles thereto, said handhold and arm above a predetermined level comprising a pair of counterpart walls normally sprung toward each other, a cutter head of approximately quadrangular shape and comprising a pair of counterpart plates, said head pivotally mounted and clamped at its rear side between the upper termini of said handle, a cutter blade removably securable between the counterpart plates and with a cutting edge exposed at the front side of the head opposite its pivoted side, said plates of the cutter head formed with corresponding irregular shaped embossments mainly parallel to its front edge to engage between the upper handle parts and spring them apart to frictionally retain the cutter head in the sheathed position or in a position at right angles to the direction of the hand-hold with the blade exposed in a common plane with the hand-hold and the cutting edge forward of the handle and transversely of it.

5. A scraper device comprising an inverted L-shaped handle of which the longer arm comprises a hand-hold and the short arm extends integrally sidewise therefrom, said hand-hold and arm above a predetermined level comprising a pair of spaced, counterpart walls normally sprung toward each other, a cutter head of approximately quadrangular shape and comprising a pair of counterpart plates, said head pivotally mounted and clamped at its rear side between the upper termini of said handle, a cutter blade removably securable between the counterpart plates and with a cutting edge exposed at the front edge of the head opposite its pivoted side, said counterpart plates of the cutter head formed with like irregularly shaped embossments mainly parallel to the front edge of the cutter head to engage between the upper handle parts and spring them apart to frictionally retain the head in the sheathed position or in a position at right angles to the direction of the hand-hold with the blade exposed forward of the hand-hold and its cutting edge transversely of it, means for clamping the blade in the cutter head comprising a screw insertable in one side of the head and threaded through the wall of the opposite side of the head, inward of the cutter blade, the screw projecting beyond the latter side wall and adapted to engage the top edge of the handle arm when the head is in the cutting position transversely of the hand-hold.

JENNINGS NELSON.